(12) United States Patent
Londarenko et al.

(10) Patent No.: US 11,404,682 B2
(45) Date of Patent: Aug. 2, 2022

(54) NON-RECTANGULAR SHAPED ELECTRODES UTILIZING COMPLEX SHAPED INSULATION

(71) Applicant: Apple Inc., Cupertino, CA (US)

(72) Inventors: Yuriy Y. Londarenko, San Jose, CA (US); Shabab Amiruddin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 15/833,106

(22) Filed: Dec. 6, 2017

(65) Prior Publication Data

US 2019/0013510 A1    Jan. 10, 2019

Related U.S. Application Data

(60) Provisional application No. 62/528,700, filed on Jul. 5, 2017.

(51) Int. Cl.
| | | |
|---|---|---|
| *H01M 4/04* | (2006.01) |
| *H01M 4/70* | (2006.01) |
| *H01M 50/46* | (2021.01) |
| *H01M 50/531* | (2021.01) |
| *H01M 4/13* | (2010.01) |
| *H01M 4/02* | (2006.01) |
| *H01M 10/052* | (2010.01) |

(52) U.S. Cl.
CPC ........... *H01M 4/0404* (2013.01); *H01M 4/70* (2013.01); *H01M 50/46* (2021.01); *H01M 50/531* (2021.01); *H01M 4/13* (2013.01); *H01M 10/052* (2013.01); *H01M 2004/021* (2013.01)

(58) Field of Classification Search
CPC ........ H01M 4/0404; H01M 4/70; H01M 4/13; H01M 2/1673; H01M 50/46; H01M 50/531
See application file for complete search history.

(56) References Cited

U.S. PATENT DOCUMENTS

| | | | | |
|---|---|---|---|---|
| 8,440,355 B2 * | 5/2013 | Yang | ................. | H01M 2/26 429/234 |
| 9,431,679 B2 * | 8/2016 | Kwon | ............... | H01M 10/0583 |
| 10,263,240 B2 * | 4/2019 | Rubino | ................. | H01M 4/131 |
| 2004/0161662 A1 * | 8/2004 | Kim | ........................ | H01M 4/70 429/94 |
| 2014/0255778 A1 * | 9/2014 | Huh | ........................ | H01M 2/26 429/211 |
| 2016/0141589 A1 * | 5/2016 | Kang | ................. | H01M 2/1653 429/179 |
| 2016/0344004 A1 | 11/2016 | Kepler et al. | | |

(Continued)

FOREIGN PATENT DOCUMENTS

WO    WO-2017208537 A1 * 12/2017 ........ H01M 10/0525

*Primary Examiner* — Jonathan G Jelsma
(74) *Attorney, Agent, or Firm* — BakerHostetler

(57) ABSTRACT

The disclosed technology relates to electrodes of a battery cell. The electrodes include a current collector having a first non-rectangular shape, an active coated region having a second non-rectangular shape, an insulator coated region having a third non-rectangular shape, and an uncoated tab disposed adjacent to the insulator coated region. The insulator coated region is disposed along a periphery of the current collector along a plurality of sides or edges of the current collector providing several locations for the tab to be positioned.

20 Claims, 10 Drawing Sheets

(56) References Cited

U.S. PATENT DOCUMENTS

2016/0380241 A1* 12/2016 Yun ..................... H01M 50/116
                                                            429/144
2019/0006717 A1* 1/2019 Wakimoto ........ H01M 10/0585
2019/0259979 A1* 8/2019 Ryu ..................... H01M 50/20

* cited by examiner

NON-RECTANGULAR SHAPED ELECTRODES UTILIZING COMPLEX SHAPED INSULATION

PRIORITY

This application claims the benefit under 35 U.S.C. § 119(e) of U.S. Provisional Patent Application Ser. No. 62/528,700, entitled "NON-RECTANGULAR SHAPED ELECTRODES UTILIZING COMPLEX SHAPED INSULATION," filed on Jul. 5, 2017, which is incorporated herein by reference in its entirety.

TECHNICAL FIELD

The present disclosure relates generally to battery cells, and more particularly, to non-rectangular shaped electrodes utilizing complex shaped insulation coating.

BACKGROUND

Battery cells are presently used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of alternating layers of anode and cathode electrodes, with a separator disposed there-between. The layers may be packaged in a flexible pouch or case. Such pouches or cases may be tailored to various cell dimensions, allowing lithium batteries to be used in space-constrained portable electronic devices. The anode electrodes may be connected together using a common anode tab that is coupled to corresponding tabs disposed on each of the anode electrodes. The cathode electrodes may be similarly connected together using a common cathode tab that is coupled to corresponding tabs disposed on each of the cathode electrodes. The common anode tab and the common cathode tab may extend from their respective electrodes disposed within the pouch or case to allow the cell's energy to be transferred to an external component. The pouch or case enclosing the anode and cathode electrodes may be filled with electrolyte.

The common anode or cathode tabs are conventionally manufactured using a die process which often results in sharp edges or burs along the periphery of the common tabs. To prevent or reduce the risk of unwanted shorting and to increase protection, each anode and/or cathode electrode may be coated with a linear strip of an insulating material to prevent or reduce the likelihood that a common tab with a sharp edge or burr may inadvertently contact an adjacent electrode thereby causing a short that could lead to a thermal event. The insulating material, however, is conventionally applied linearly and only allows for placement of the common tabs on a single side of the electrode.

SUMMARY

The disclosed embodiments provide a non-rectangular electrode having a non-rectangular insulator coated region for placement of a common tab on various sides of the electrode. The electrode includes a current collector having a first non-rectangular shape, an active coated region having a second non-rectangular shape, an insulator coated region having a third non-rectangular shape, and a tab disposed adjacent to the insulator coated region.

In some embodiments, a battery cell includes a plurality of layers, an enclosure enclosing the plurality of layers, and a set of tabs extending from the pouch. The plurality of layers includes a cathode, a separator, and an anode. The anode and cathode each include a current collector having a non-rectangular shape, an active coated region having a non-rectangular shape, an insulator coated region having a non-rectangular shape, and a tab disposed adjacent to the insulator coated region.

In some embodiments, a method for creating a plurality of electrodes. The method includes applying an active coating on a current collector in a non-rectangular shape, applying an insulator coating in a complex shape, and creating a plurality of electrodes from the current collector. Each electrode has an active coated portion, an insulator coated portion, and a non-coated tab.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in a flexible pouch or case. The anode electrodes may be connected together using a common anode tab that is coupled to corresponding tabs disposed on each of the anode electrodes. The cathode electrodes may be similarly connected together using a common cathode tab that is coupled to corresponding tabs disposed on each of the cathode electrodes. The common anode tab and the common cathode tab may extend from their respective electrodes disposed within the pouch or case to allow the cell's energy to be transferred to an external component. The pouch or case enclosing the anode and cathode electrodes may be filled with electrolyte.

Conventionally, the common anode or cathode tabs are manufactured using a die process which often results in sharp edges or burs along the periphery of the common tabs. To prevent or reduce the risk of unwanted shorting and to increase protection, each anode and/or cathode electrode may be coated with a linear strip of an insulating material to prevent or reduce the likelihood that a common tab with a sharp edge or burr may inadvertently contact an adjacent electrode thereby causing a short that could lead to a thermal event. The insulating material, however, is conventionally applied linearly and only allows for placement of the common tabs on a single side of the electrode.

Figure 1:
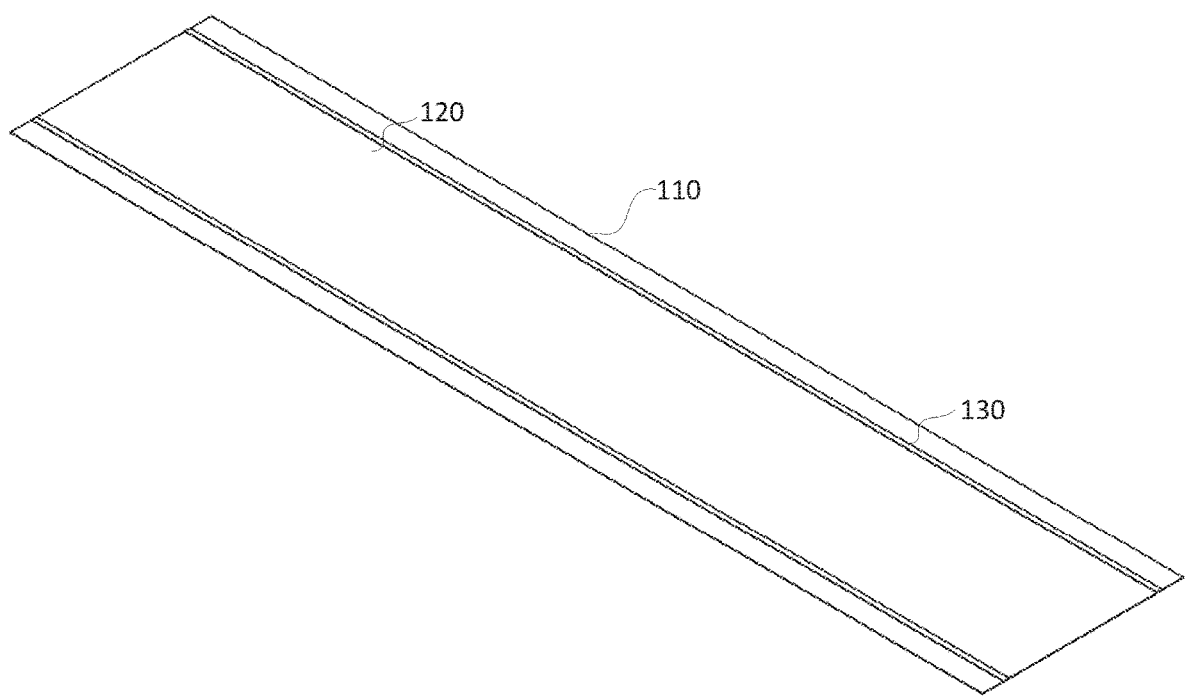
FIG. 1 illustrates an example of an uncut electrode sheet.

For example, referring to FIG. 1, an example of an uncut electrode sheet 100 is illustrated. The uncut electrode sheet 100 may be an anode current collector 110, such as copper, or a cathode current collector 110, such as aluminum. A region of the current collector 110 is coated with an active coating 120 and a smaller region of the current collector is coated with an insulation coating 130. As shown in FIG. 1, the insulation coating is conventionally applied linearly with a roller, longitudinally along the length of the uncut electrode sheet 100.

Figure 2A:
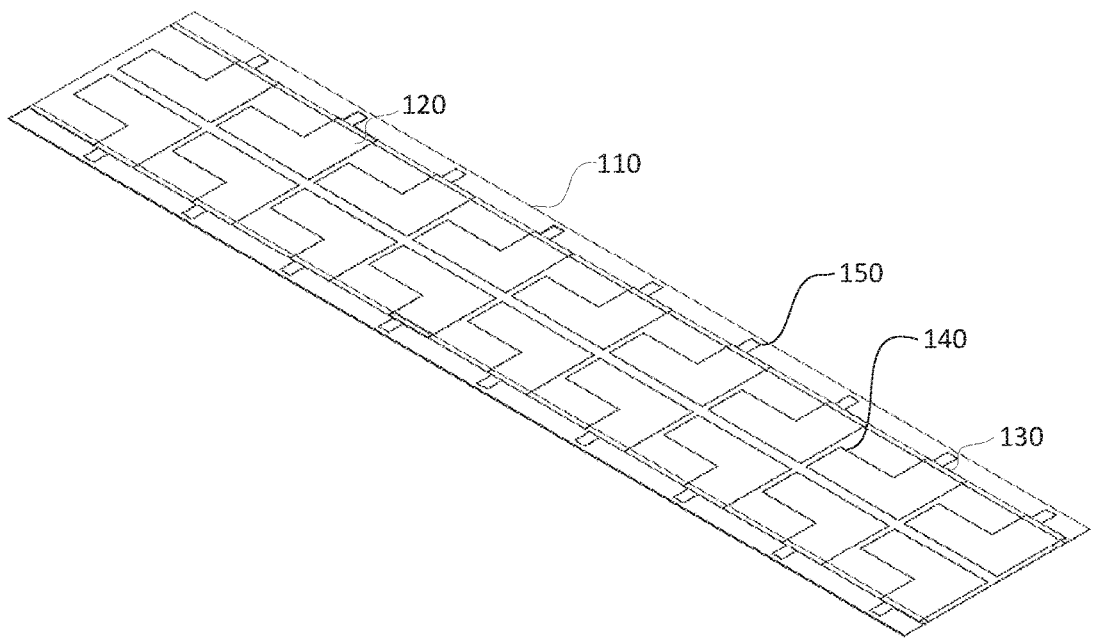
FIG. 2A illustrates perspective view of an example cut electrode sheet.
Figure 2B:
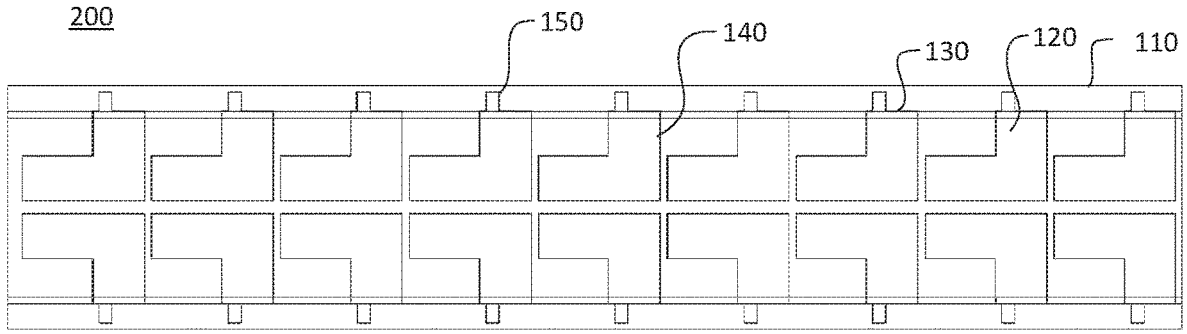
FIG. 2B illustrates top view of an example cut electrode sheet.

Referring to FIGS. 2A and 2B, to create individual electrodes 140 from the uncut electrode sheet 100, the electrode sheet 100 is cut into a plurality of electrodes 140 thereby creating a cut electrode sheet 200. Each electrode 140 conventionally has a region with an active coating 120, a single strip of insulation coating 130, and an uncoated tab 150.

Figure 3:
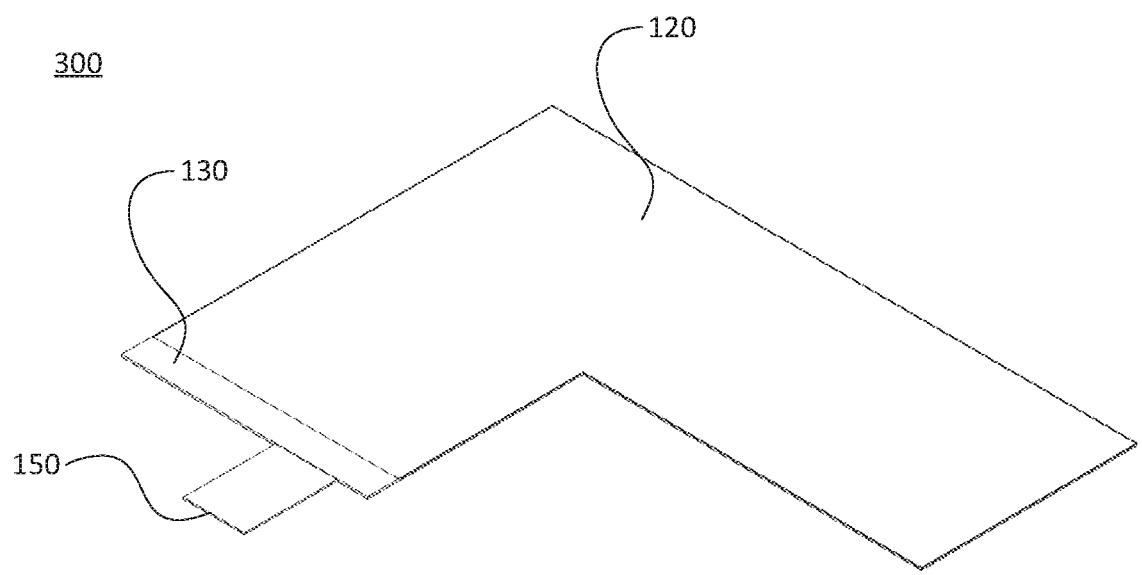
FIG. 3 illustrates a perspective view of an example single electrode.

FIG. 3 illustrates a perspective view of an example single electrode 300 as known in the prior art. The single electrode 300 includes a region having an active coating 120 and a strip of insulation coating 130 disposed along a single edge of the electrode 300. Because the insulation coating 130 is disposed along a single edge, placement of the tab 150 is limited to a single side or edge of the electrode 300. Limiting tab 150 placement to a single side or edge of the electrode may require longer cable runs, causing more resistance, increases battery volume, and may decreases packaging efficiency.

The electrodes of the subject technology solve some or all of the foregoing problems by providing a non-rectangular shaped insulation coated region for placement of a tab on various sides of the electrode. In one aspect, by utilizing a non-rectangular shaped insulation coated region to thereby allow placement of a tab on various sides of an electrode, battery volume is decreased and packaging efficiency is improved while improving battery performance by shortening cable runs from the electrode to external components. By shortening cable runs, resistance caused by longer cable runs is eliminated.

Figure 4:
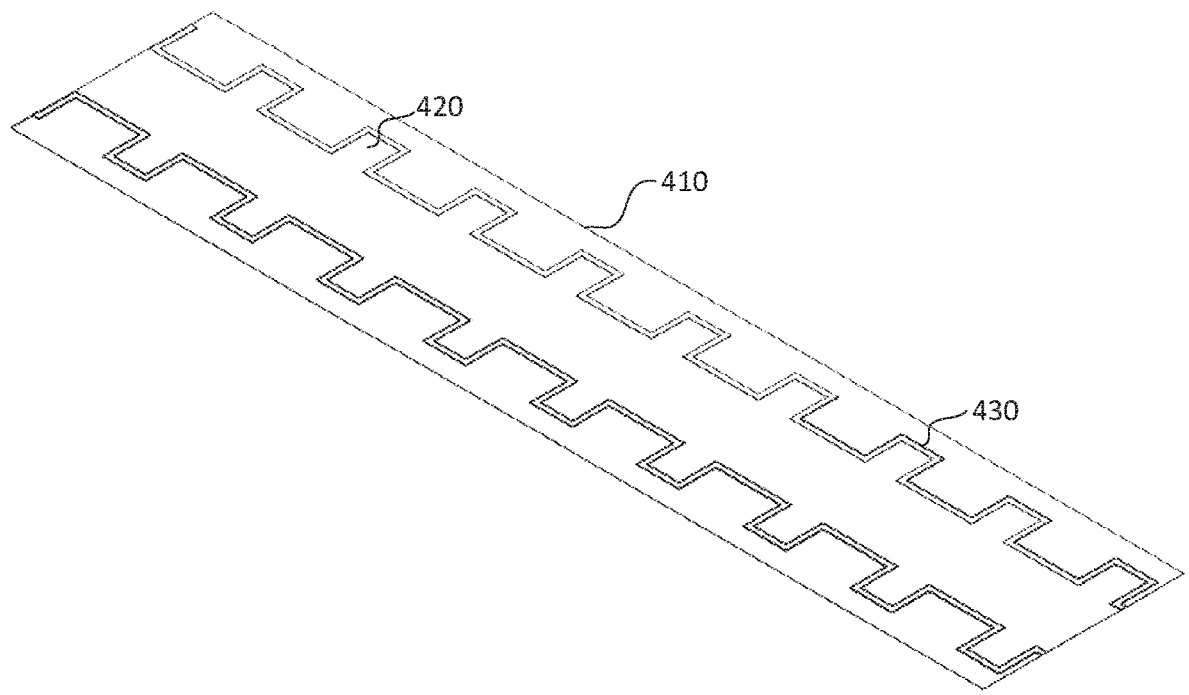
FIG. 4 illustrates a perspective view of an uncut electrode sheet, in accordance with various aspects of the subject technology.

FIG. 4 illustrates a perspective view of an uncut electrode sheet 400, in accordance with various aspects of the subject technology. The uncut electrode sheet 400 may comprise an anode current collector 410, such as a copper foil, or a cathode current collector 410, such as an aluminum foil. A region of the current collector 410 is coated with an active coating 420 such as carbon or graphite for the anode, or a lithium compound (e.g., $LiCoO_2$, LiNCoMn, LiCoAl or $LiMn_2O_4$) for the cathode. The active coating 420 may be applied in a non-rectangular shape and in a repeating pattern. In one aspect, the non-rectangular shape of the active coating 420 may be mirrored along a centerline of the current collector 410.

The current collector 410 also includes a region coated with insulation material 430. The insulation material may be a ceramic, ceramic dielectric, composite, epoxy, oxide, polypropylene, polymer, acrylic, or any combination thereof. In some aspects, other electrical insulating materials may be used, as may be known by a person of ordinary skill in the art. In one aspect, the insulation material is configured to prevent a short that may be caused by coming into contact with an adjacent electrode or common tab, as discussed further below with reference to FIGS. 7A and 7B. The insulation coating 430 may be applied adjacent to an edge of the active coating 420. In one aspect, the insulation coating 430 may be applied on or over a portion of the active coating 420. In another aspect, the insulation coating 430 may follow a similar geometry as the edge of the active coating 420. In some aspects, the insulation coating 430 may be applied to have a width of about 1.0 mm to 5.0 mm. In some aspects, insulation coating 430 can be applied in increments of about 0.25 mm. The insulation coating 430 may be applied in a non-rectangular shape and in a repeating pattern. In one aspect, the non-rectangular shape of the insulation coating 430 may be mirrored along a centerline of the current collector 410.

Figure 5A:
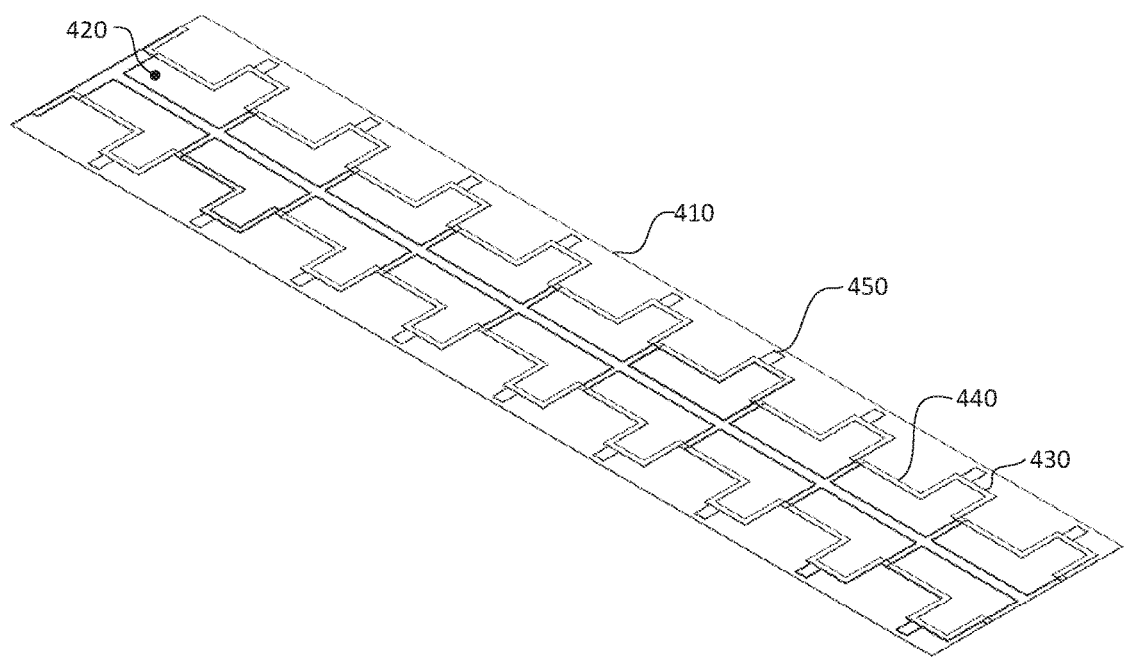
FIG. 5A illustrates a perspective view of a cut electrode sheet, in accordance with various aspects of the subject technology.
Figure 5B:
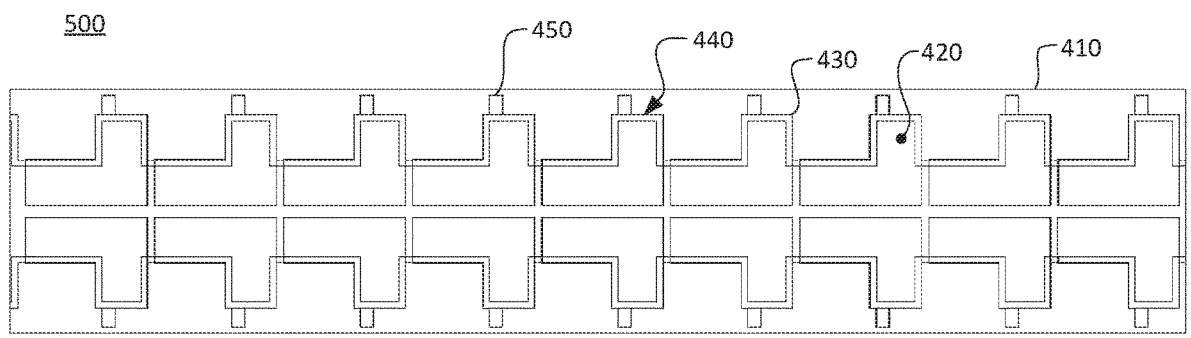
FIG. 5B illustrates a top view of a cut electrode sheet, in accordance with various aspects of the subject technology.

FIGS. 5A and 5B illustrate views of a cut electrode sheet 500, in accordance with various aspects of the subject technology. The uncut electrode sheet 400 may be cut into a plurality of electrodes 440 thereby forming the cut electrode sheet 500. Each electrode of the plurality of electrodes 440 may have a similar shape. In one aspect, the shape of each electrode of the plurality of electrodes 440 may be non-rectangular. In another aspect, the shape of each electrode 440 may be based on maximizing the number of sides or edges of the electrode having an insulated coated region 430. Each electrode 440 may be comprised of a portion of the current collector 410, an active coated region 420, an insulated coated region 430, and an uncoated tab 450.

FIGS. 6A, 6B, 6C, and 6D illustrate top views of an electrode 600, in accordance with various aspects of the subject technology. The electrode 600 may comprise a portion of the current collector 410, an active coated region 420, an insulated coated region 430, and an uncoated tab 450. The current collector 410 may have a non-rectangular shape comprising a first planar surface (e.g., top surface) and a second planar surface (e.g., bottom surface). The second planar surface may be disposed opposite the first planar surface. In one aspect, the non-rectangular shape of the current collector 410 has a shape geometry of more than four sides. For example, the non-rectangular shape of the current collector 410 may have six sides forming an "L" shape. By way of another example, the non-rectangular shape of the current collector 410 may have eight sides forming a "U" shape. In some aspects, the non-rectangular shape of the current collector 410 may have one or more curved sides and may, for example, also include circular shapes that are non-rectangular. In another aspect, if the current collector 410 includes the tab 450, then the number of sides of the current collector 410 may increase accordingly. For example, for a current collector having an "L" shape with about six sides, including the tab 450 may increase the number of sides of the non-rectangular shape to nine sides if the tab has a rectangular or square shape.

The active coated region 420 of the electrode 600 may be disposed on a portion of the first planar surface of the current collector 410. The active coated region 420 may have a non-rectangular shape. In one aspect, the non-rectangular shape of the active coated region 420 may be different from the non-rectangular shape of the current collector 410. For example, if the current collector 410 forms an "L" shape and has six sides, the active coated region 420 may have eight sides. If the current collector 410 includes the tab 450, the current collector may have nine sides and the active coated region 420 may have eight sides.

The insulator coated region 430 of the electrode 600 may be disposed on a portion of the first planar surface of the current collector 410. The insulator coated region 430 may have a non-rectangular shape. In one aspect, the non-rectangular shape of the insulator coated region 430 may be different from the non-rectangular shape of the current collector 410 and the non-rectangular shape of the active coated region 420. For example, if the current collector 410 forms an "L" shape and has six sides, the active coated region 420 may have eight sides, and the insulator coated region 430 may have ten sides. If the current collector 410 includes the tab 450, the current collector may have nine sides, the active coated region 420 may have eight sides, and the insulator coated region 430 may have ten sides.

In one example, the portions of the current collector 410 having the active coating 420 and the insulator coating 430 may be different or separate portions of the current collector 410. In another example, the portion of the current collector 410 having the insulator coating 430 may include a portion of the active coated region 420. In this example, the insulator coated region 430 may be applied on or over a portion of the active coated region 420.

In one aspect, the insulator coated region 430 may be disposed along a periphery of the current collector 410. For example, referring to FIG. 6A, the insulator coated region 430 may extend along a periphery of the current collector 410 to create an insulated coated region on a first side 430A of the current collector 410 and a second side 430B of the current collector 410. By way of another example, the insulator coated region 430 may extend along the periphery of the current collector 410 to create an insulated coated region on the first side 430A, the second side 430B, and a third side 430C of the current collector 410. By way of yet another example, the insulator coated region 430 may extend along the periphery of the current collector 410 to create an insulated coated region on the first side 430A, the second side 430B, the third side 430C, and a fourth side 430D of the current collector 410. In some aspects, the first side 430A may abut the second side 430B, the second side 430B may abut the third side 430C, and the third side 430C may abut the fourth side 430D.

The tab 450 may comprise an uncoated region of the current collector 410. In some aspects, the tab 450 may be configured to provide an area for coupling with a common tab (as shown in FIG. 7B). By providing an uncoated region on the current collector 410 for coupling to a common tab, the energy of the electrode 600 may be transferred to an external component. In other aspects, the tab 450 may allow other electrodes 600 to be coupled together through welding or bonding of the respective tabs 450 of the other electrodes 600.

Figure 6A:
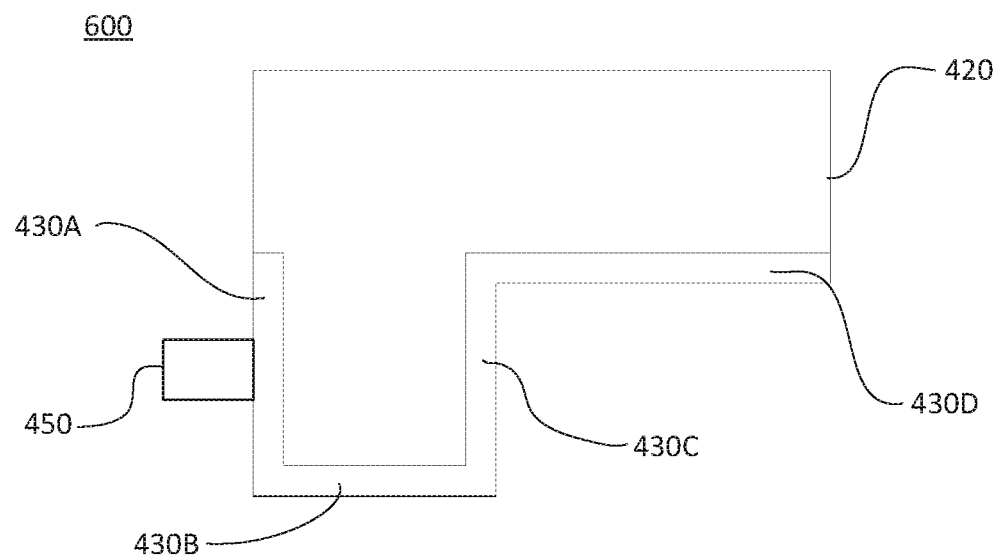
FIGS. 6A, 6B, 6C, and 6D illustrate top views of an electrode, in accordance with various aspects of the subject technology.
Figure 6B:
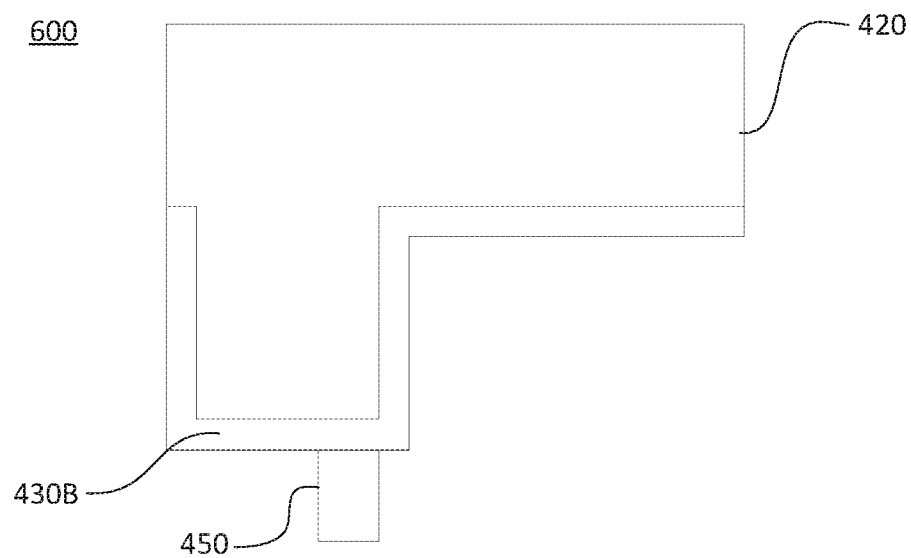
Figure 6C:
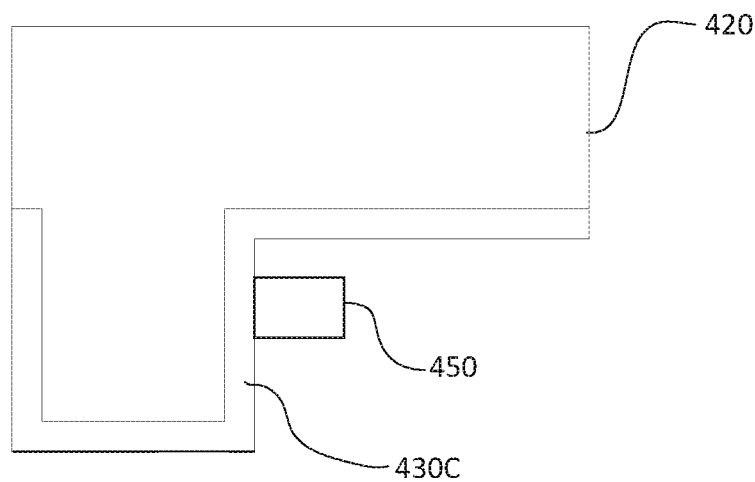
Figure 6D:
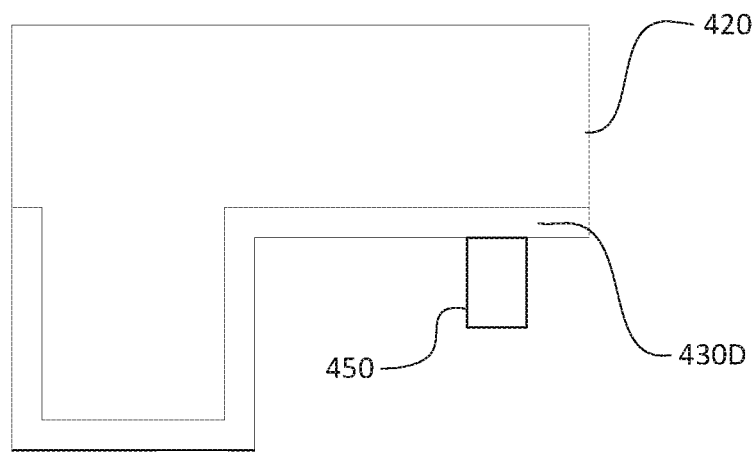

The tab 450 may be disposed adjacent to the insulator coated regions 430A-D to prevent an accidental or inadvertent short with an adjacent electrode or common tab, as discussed below with reference to FIGS. 7A and 7B. Referring to FIG. 6A, the tab 450 may be disposed adjacent to the first side of the insulator coated region 430A. By way of another example and referring to FIG. 6B, the tab 450 may be disposed adjacent to the second side of the insulator coated region 430B. By way of yet another example and referring to FIG. 6C, the tab 450 may be disposed adjacent to the third side of the insulator coated region 430C. By way of yet another example and referring to FIG. 6D, the tab 450 may be disposed adjacent to the fourth side of the insulator coated region 430D.

In one aspect, the electrode 600 may include an active coated region and an insulator coated region disposed on the second planar surface of the current collector 410. The active coated region may be disposed on a portion of the second planar surface and may have a non-rectangular shape. In some aspects, the non-rectangular shape of the active coated region disposed on the second planar surface may be substantially the same as the non-rectangular shape of the active coated region 420 disposed on the first planar surface of the current collector 410.

The insulator coated region may be disposed on a portion of the second planar surface and may have a non-rectangular shape. In some aspects, the non-rectangular shape of the insulator coated region disposed on the second planar surface may be substantially the same as the non-rectangular shape of the insulator coated region 430 disposed on the first planar surface of the current collector 410.

Figure 7A:
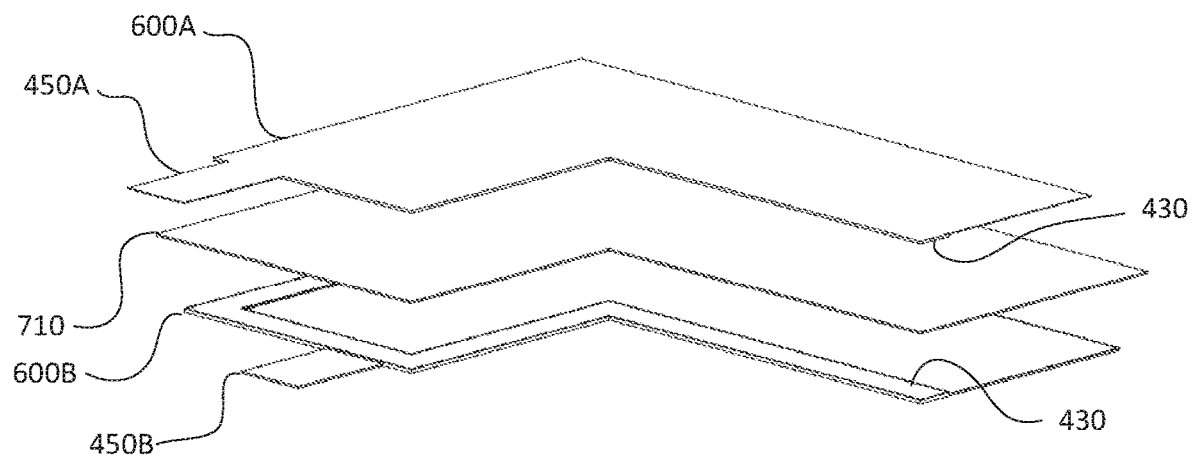
FIG. 7A illustrates a perspective view of a plurality of layers, in accordance with various aspects of the subject technology.
Figure 7B:
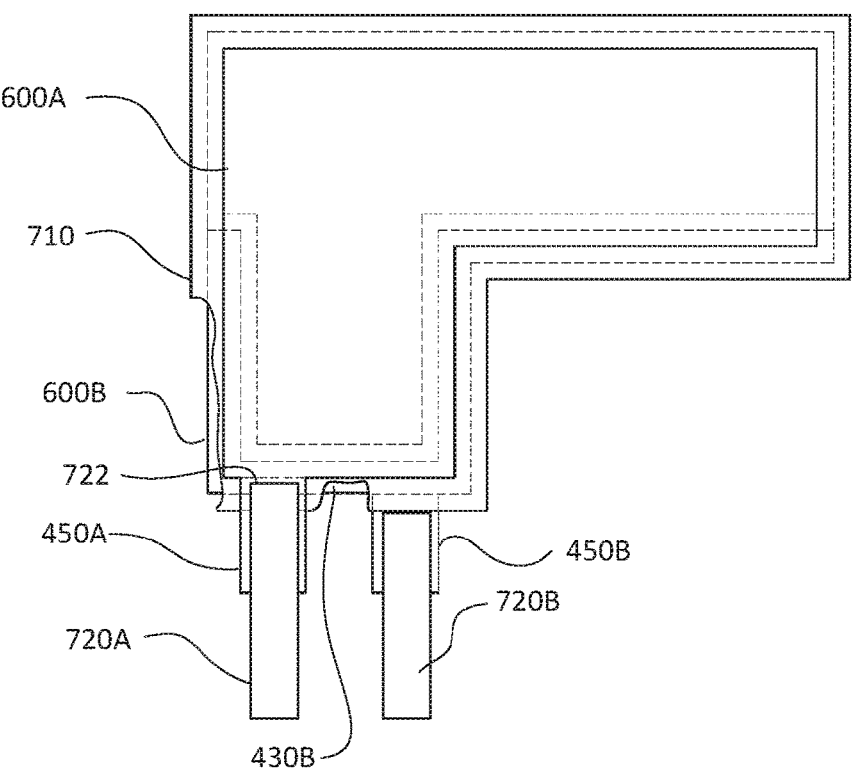
FIG. 7B illustrates a top view of a plurality of layers, in accordance with various aspects of the subject technology.

FIG. 7A illustrates a perspective view of a plurality of layers 700, in accordance with various aspects of the subject technology. The plurality of layers 700 may include a cathode electrode 600A, a separator 710, and an anode electrode 600B. Each electrode 600A, 600B has an active coated region and an insulator coated region 430 disposed on a periphery of each electrode 600A, 600B. Each electrode 600A, 600B also has an uncoated tab 450A, 450B disposed adjacent to their respective insulator coated regions 430. The separator 710 may comprise a micro-porous membrane and may include polyethylene (PP), polypropylene (PP), and/or a combination of PE and PP, such as PE/PP or PP/PE/PP. The cathode 600A, separator 710, and electrode 600B may be arranged in a stacked configuration.

Referring to FIG. 7B, a top view of the plurality of layers 700 is illustrated, in accordance with various aspects of the subject technology. The separator 710 may have a non-rectangular shape that may be substantially similar to the non-rectangular shape of the electrodes 600A, 600B. The separator 710 may be larger in area than either of the electrodes 600A, 600B to prevent inadvertent contact between the cathode 600A and the anode 600B. In one aspect, the cathode 600A may be smaller in area and may be subsumed by the anode 600B.

In some aspects, a location of the tab 450A for the cathode 600A may be at a different location than a location of the tab 450B for the anode 600B. For example, the location of the tabs 450A, 450B may be along any edge or side having the insulator coating region 430, including the first side 430A, second side 430B, third side 430C or fourth side 430D, as shown in FIG. 6A.

The tab 450A for the cathode 600A may be coupled to a cathode common tab 720A. The tab 450B for the anode 600B may be coupled to an anode common tab 720B. The cathode common tab 720A and the anode common tab 720B may extend from their respective electrodes 600A, 600B to provide an external electrical connection, as discussed below with reference to FIG. 8. The common tabs 720A, 720B are conventionally manufactured using a die process. As such, one or more edges of the common tabs 720A, 720B may have a burr or sharp edge that may exceed acceptable tolerances. In such circumstances, a bur or sharp edge of a common tab 720A, 720B may penetrate the separator 710 and come into inadvertent contact with an adjacent electrode. If the adjacent electrode is without an insulator coated region, an electrical short may occur leading to a thermal event or failure of the battery. For example, referring to FIG. 7B, an edge 722 of the common tab 720A of the cathode 600A may overlap with a portion of the anode 600B. If the edge 722 contains a burr that exceeds acceptable tolerances, insulator coated region 430B prevents a short from occurring.

Figure 8:
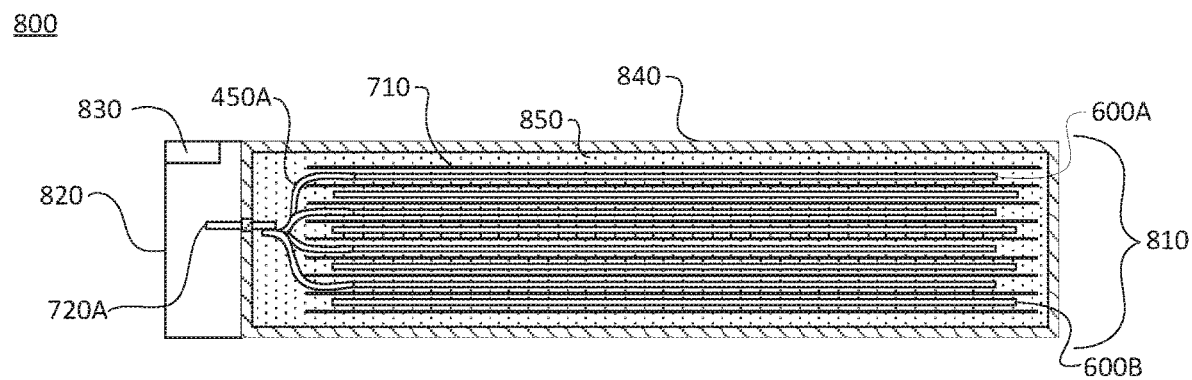
FIG. 8 illustrates a cross-section view of an assembled battery, in accordance with various aspects of the subject technology.

Referring to FIG. 8, a cross-section view of an assembled battery 800 is illustrated, in accordance with various aspects of the subject technology. The assembled battery 800 includes a battery cell 810, a battery management unit 820, and battery terminals 830. The battery management unit 820 is configured to manage recharging of the battery 800. The terminals 830 are configured to engage with corresponding connectors on a portable electronic device to provide power to components of the portable electronic device.

The battery cell 810 includes a plurality of layers comprising the cathode with an active coating 600A, the separator 710, and the anode with an active coating 600B. The plurality of layers 810 may be wound to form a jelly roll structure or can be stacked to form a stacked-cell structure. The plurality of layers 810 are enclosed within a pouch or casing 840 and immersed in an electrolyte 850, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The anode layers 600B of the plurality of layers 810 are coupled to a first conductive tab (shown in FIG. 7B as reference numeral 720B). In one aspect, the first conductive tab may be coupled to the anode layers 600B via an uncoated tab (shown in FIG. 7B as reference numeral 450B). The cathode layers 600A of the plurality of layers 810 are coupled to a second conductive tab 720A. In one aspect, the second conductive tab 720A may be coupled to the cathode layers 600A via the uncoated tab 450A. The first common tab and the second common tab 720B may extend from the battery cell 810 for electrical connection to other battery cells, the battery management unit 820, or other components as desired.

Figure 9:
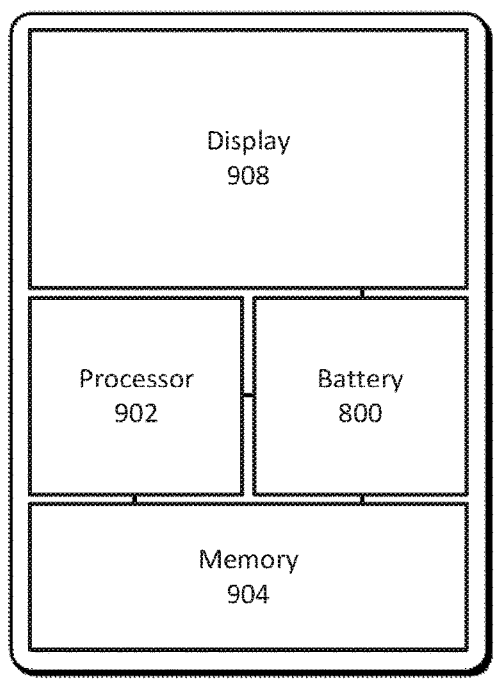
FIG. 9 illustrates a portable electronic device, in accordance with various aspects of the subject technology.

Referring to FIG. 9, a portable electronic device 900 is illustrated, in accordance with various aspects of the subject technology. The above-described rechargeable battery 800 can generally be used in any type of electronic device. For example, FIG. 9 illustrates a portable electronic device 900 which includes a processor 902, a memory 904 and a display 908, which are all powered by a battery 800. Portable electronic device 900 may correspond to a laptop computer, tablet computer, mobile phone, personal digital assistant (PDA), digital music player, watch, and wearable device, and/or other type of battery-powered electronic device. Battery 800 may correspond to a battery pack that includes one or more battery cells. Each battery cell may include a set of layers sealed in a pouch or case, including a cathode with an active coating, a separator, an anode with an active coating, and may utilize electrodes having a complex shaped insulation coating to prevent accidental or inadvertent electrical shorts that may be caused by burrs or sharp edges on a common tab coupled to the cathode or anode.

Figure 10:
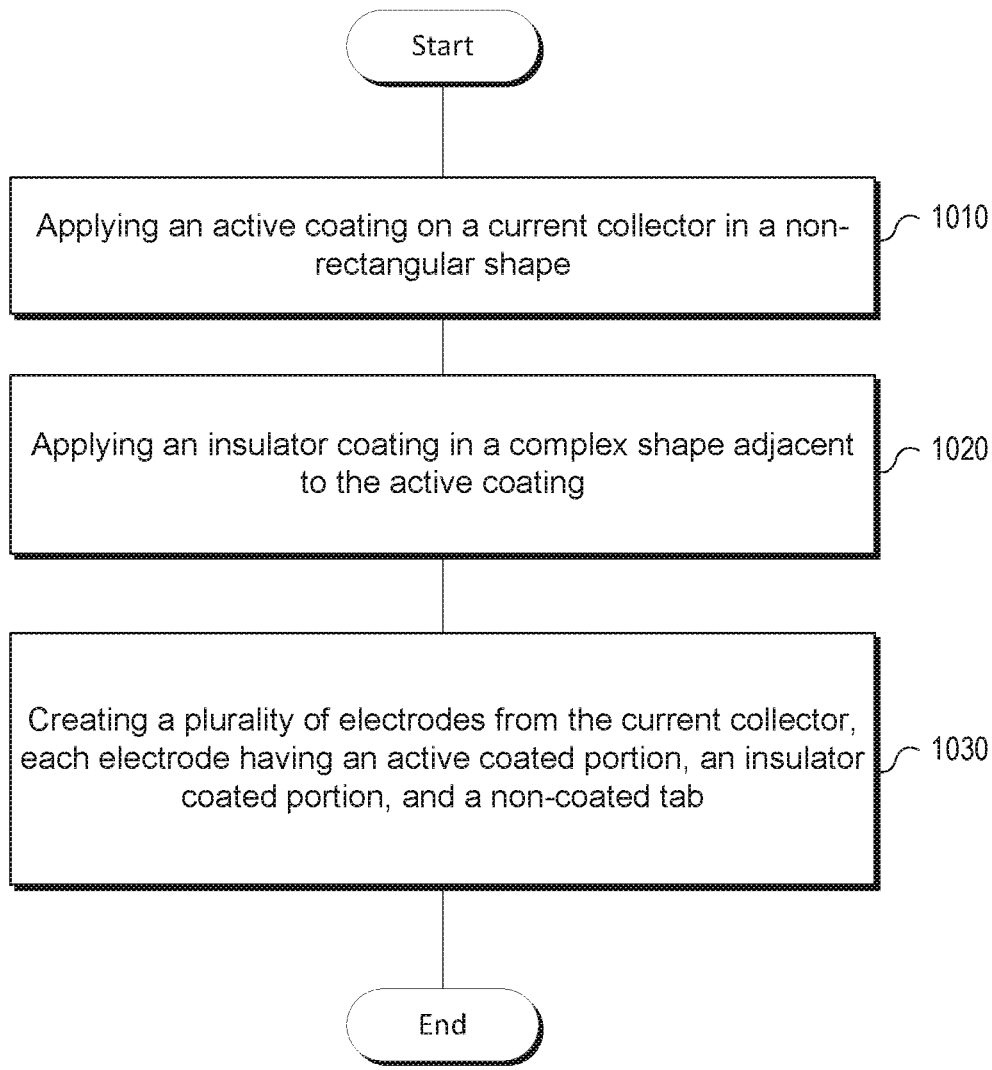
FIG. 10 illustrates an example method for creating a plurality of electrodes, in accordance with various aspects of the subject technology.

FIG. 10 illustrates an example method 1000 for creating a plurality of electrodes, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1010, an active coating is applied on a current collector in a non-rectangular shape. As discussed above, the non-rectangular shape may include any shape having more than four sides. Alternatively, the non-rectangular shape may include a shape having curvature or other non-linear shapes.

At operation 1020, an insulator coating is applied on the current collector in a complex shape. The insulator coating may be disposed adjacent to the active coating. As discussed above, the complex shape may be a non-rectangular shape that is different from the non-rectangular shape of the active coating.

At operation 1030, a plurality of electrodes is created from the current collector through a cutting, stamping, die, or similar process. Each electrode of the plurality of electrodes has an active coated portion, an insulator coated portion, and a non-coated tab. In one aspect, the insulator coated portion may be disposed along a periphery of each electrode of the plurality of electrodes. The periphery may include a first, second, third and fourth side of each electrode of the plurality of electrodes. The first side may abut the second side, the second side may abut the third side, and the third side may abut the fourth side.

The tab may be disposed on the first side of each electrode of the plurality of electrodes. Alternatively, the tab may be disposed on the second side of each electrode of the plurality of electrodes. As yet another example, the tab may be disposed on the third side of each electrode of the plurality of electrodes. As yet another example, the tab may be disposed on the fourth side of each electrode of the plurality of electrodes.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An electrode, comprising:
a current collector having a first non-rectangular shape, the current collector comprising a first planar surface and a second planar surface, the second planar surface disposed opposite the first planar surface;
an active coated region disposed on a portion of the first planar surface, the active coated region having a second non-rectangular shape;
an insulator coated region consisting of a non-conductive insulation material disposed on a portion of the first planar surface to prevent an electrical short with an adjacent electrode, the non-conductive insulator coated region having a third non-rectangular shape; and
a tab extending directly from the non-conductive insulator coated region, the tab comprising an uncoated region of the current collector, wherein the non-conductive insulator coated region extends contiguously across the tab, and wherein the first non-rectangular shape of the current collector comprises nine sides, the second-nonrectangular shape of the active coated region comprises eight sides, and the third non-rectangular shape of the insulator coated region comprises ten sides.

2. The electrode of claim 1, wherein the first non-rectangular shape is different from the second non-rectangular shape and the third non-rectangular shape.

3. The electrode of claim 1, wherein the second non-rectangular shape is different from the first non-rectangular shape and the third non-rectangular shape.

4. The electrode of claim 1, wherein the third non-rectangular shape is different from the first non-rectangular shape and the second non-rectangular shape.

5. The electrode of claim 1, wherein the portion of the active coated region is separate from the portion of the insulator coated region.

6. The electrode of claim 1,
wherein the portion of the insulator coated region is disposed along a periphery of the current collector; and
wherein at least three portions along the periphery of the current collector are not coated with an active electrode coating.

7. The electrode of claim 6, wherein the periphery comprises a first, second, third and fourth side of the current collector, the first side abutting the second side, the second side abutting the third side, and the third side abutting the fourth side.

8. The electrode of claim 7, wherein the tab is disposed on the first side.

9. The electrode of claim 7, wherein the tab is disposed on the second side.

10. The electrode of claim 7, wherein the tab is disposed on the third side.

11. The electrode of claim 7, wherein the tab is disposed on the fourth side.

12. The electrode of claim 1, wherein the second planar surface comprises:
an active coated region disposed on a portion of the second planar surface, the active coated region having the second non-rectangular shape; and
an insulator coated region disposed on a portion of the second planar surface, the insulator coated region having the third non-rectangular shape.

13. A battery cell, comprising:
a plurality of layers, wherein the plurality of layers comprise an anode, a separator, and a cathode;
an enclosure enclosing the plurality of layers; and
a first and second conductive tab extending from the enclosure, the first conductive tab coupled to the anode and the second conductive tab coupled to the cathode;
wherein the anode and cathode each comprise:
a current collector having a first non-rectangular shape, each current collector comprising a first planar surface and a second planar surface, the second planar surfaces disposed opposite the first planar surfaces;
an active coated region disposed on a portion of each of the first planar surfaces, the active coated regions each having a second non-rectangular shape;
an insulator coated region consisting of a non-conductive insulation material disposed on a portion of each of the first planar surfaces to prevent an electrical short with an adjacent electrode, the non-conductive insulator coated regions each having a third non-rectangular shape; and
a tab extending directly from the non-conductive insulator coated regions, the tab comprising an uncoated region of the current collector, wherein the non-conductive insulator coated region extends contiguously across the tab, wherein the first non-rectangular shape of the current collector comprises nine sides, the second-nonrectangular shape of the active coated region comprises eight sides, and the third non-rectangular shape of the insulator coated region comprises ten sides.

14. The battery cell of claim 13, wherein the first conductive tab is coupled to the tab of the anode; and wherein the second conductive tab is coupled to the tab of the cathode.

15. The battery cell of claim 13,
wherein the portions of the insulator coated regions are disposed along a periphery of the current collectors; and
wherein at least three portions along the periphery of the current collectors are not coated with an active electrode coating.

16. The battery cell of claim 15, wherein the periphery comprises a first, second, third and fourth side of each of the current collectors, the first side abutting the second side, the second side abutting the third side, and the third side abutting the fourth side.

17. The battery cell of claim 13, wherein the second planar surfaces each comprise:
an active coated region disposed on a portion of each of the second planar surfaces; and
an insulator coated region disposed on a portion of each of the second planar surfaces.

18. A method for creating a plurality of electrodes, the method comprising:
applying an active coating on a current collector in a non-rectangular shape;
applying an insulator coating in a complex shape, the insulator coating consisting of a non-conductive insulation material disposed adjacent to the active coating to prevent an electrical short; and
creating a plurality of electrodes from the current collector, each electrode having the current collector with a first non-rectangular shape, an active coated portion having a second non-rectangular shape, a non-conductive insulator coated portion having a third non-rectangular shape, and a non-coated tab extending directly from the non-conductive insulator coated region, wherein the non-conductive insulator coating extends contiguously across the tab, and wherein the first non-rectangular shape of the current collector comprises nine sides, the second nonrectangular shape of the active coated region comprises eight sides, and the third non-rectangular shape of the insulator coated region comprises ten sides.

19. The method of claim 18,
wherein the insulator coated portion is disposed along a periphery of each electrode of the plurality of electrodes; and
wherein at least three portions along the periphery of each electrode of the plurality of electrodes are not coated with the active coating.

20. The method of claim 19, wherein the periphery comprises a first, second, third and fourth side of each electrode of the plurality of electrodes, the first side abutting the second side, the second side abutting the third side, and the third side abutting the fourth side.

\* \* \* \* \*